United States Patent
Ueta

(10) Patent No.: US 12,430,681 B2
(45) Date of Patent: Sep. 30, 2025

(54) ORDER MANAGEMENT DEVICE AND ORDER MANAGEMENT METHOD

(71) Applicant: Panasonic Intellectual Property Management Co., Ltd., Osaka (JP)

(72) Inventor: Daisuke Ueta, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 417 days.

(21) Appl. No.: 17/925,795

(22) PCT Filed: Feb. 9, 2021

(86) PCT No.: PCT/JP2021/004728
§ 371 (c)(1),
(2) Date: Nov. 16, 2022

(87) PCT Pub. No.: WO2021/240902
PCT Pub. Date: Dec. 2, 2021

(65) Prior Publication Data
US 2023/0196444 A1    Jun. 22, 2023

(30) Foreign Application Priority Data
May 27, 2020    (JP) ................. 2020-092346

(51) Int. Cl.
*G06Q 20/20* (2012.01)
*G06F 16/901* (2019.01)
*G06Q 30/0601* (2023.01)

(52) U.S. Cl.
CPC ..... *G06Q 30/0635* (2013.01); *G06F 16/9017* (2019.01); *G06F 16/9024* (2019.01); *G06Q 20/208* (2013.01)

(58) Field of Classification Search
CPC ............. G06Q 30/0635; G06Q 20/208; G06Q 30/0643; G06Q 10/087; G06F 16/9017; G06F 16/9024; G07G 1/0036
See application file for complete search history.

(56) References Cited

U.S. PATENT DOCUMENTS 9,412,099 B1    8/2016  Tyree
10,007,964 B1 * 6/2018  Calhoon ............... G06T 3/40
(Continued)

FOREIGN PATENT DOCUMENTS

CN    111626681 B  *  9/2023  ......... G06Q 10/087
EP    3168784 A1   *  5/2017  ......... G06Q 10/087
(Continued)

OTHER PUBLICATIONS

International Search Report issued in International Patent Application No. PCT/JP2021/004728, dated May 18, 2021, along with an English translation thereof.
(Continued)

*Primary Examiner* — Ashford S Hayles
(74) *Attorney, Agent, or Firm* — Greenblum & Bernstein, P.L.C.

(57) ABSTRACT

An order management device is provided with: an input circuit that acquires information about a plurality of articles including an order candidate article and to be subjected to image recognition after the order candidate article is ordered; a determination circuit that determines, with respect to two or more different articles included in the plurality of articles, an index indicating a possibility that the articles are incorrectly recognized as the same article when the image recognition is performed, on the basis of information about the similarity among the plurality of articles in the image recognition; and an output circuit that outputs information about the determined index.

10 Claims, 11 Drawing Sheets

(56) References Cited

U.S. PATENT DOCUMENTS

| | | | | |
|---|---|---|---|---|
| 10,607,116 B1* | 3/2020 | Omer | ............... | G06Q 10/06393 |
| 10,664,722 B1* | 5/2020 | Sharma | .................. | G06V 10/82 |
| 11,117,744 B1* | 9/2021 | Medioni | ............... | G06Q 10/087 |
| 2002/0077914 A1* | 6/2002 | Shatzkin | .............. | G06Q 10/087 |
| | | | | 705/22 |
| 2010/0106609 A1* | 4/2010 | Sherman | .............. | G06Q 20/202 |
| | | | | 705/28 |
| 2012/0243779 A1 | 9/2012 | Nakai et al. | | |
| 2013/0048722 A1* | 2/2013 | Davis | .................. | G07G 1/0036 |
| | | | | 235/383 |
| 2013/0054397 A1* | 2/2013 | Nakatake | ............. | G07G 1/0063 |
| | | | | 705/23 |
| 2013/0141585 A1 | 6/2013 | Naito et al. | | |
| 2013/0144759 A1* | 6/2013 | Toyomura | .......... | G06Q 30/0629 |
| | | | | 705/26.64 |
| 2013/0182899 A1* | 7/2013 | Naito | .................... | G06V 10/987 |
| | | | | 382/103 |
| 2013/0223673 A1* | 8/2013 | Davis | ..................... | G06F 3/147 |
| | | | | 235/375 |
| 2014/0219512 A1* | 8/2014 | Sasaki | ................... | G06V 20/20 |
| | | | | 382/110 |
| 2015/0026017 A1* | 1/2015 | Tsunoda | ............. | G06Q 30/0643 |
| | | | | 705/27.2 |
| 2015/0032502 A1* | 1/2015 | Green | .................. | G06Q 20/203 |
| | | | | 705/7.29 |
| 2015/0052029 A1* | 2/2015 | Wu | ...................... | G06Q 10/087 |
| | | | | 705/28 |
| 2015/0098610 A1* | 4/2015 | Nomura | .............. | G06F 16/5838 |
| | | | | 382/103 |
| 2015/0186862 A1* | 7/2015 | Itani | ..................... | G06Q 20/204 |
| | | | | 705/23 |
| 2015/0193759 A1* | 7/2015 | Fukuda | ................ | G07G 1/0009 |
| | | | | 705/23 |
| 2015/0194025 A1* | 7/2015 | Tsunoda | .................... | G06T 7/73 |
| | | | | 348/150 |
| 2016/0086148 A1* | 3/2016 | Katsumura | ....... | G06F 18/24133 |
| | | | | 705/23 |
| 2016/0171707 A1* | 6/2016 | Schwartz | ................ | G06F 18/22 |
| | | | | 382/180 |
| 2016/0189128 A1* | 6/2016 | Sano | .................... | G07G 1/0063 |
| | | | | 705/23 |
| 2016/0196543 A1* | 7/2016 | Miyakoshi | ........... | G06V 10/945 |
| | | | | 382/103 |
| 2016/0328660 A1* | 11/2016 | Huang | ................. | G07G 1/0045 |
| 2017/0186076 A1* | 6/2017 | Hameed | .............. | G06V 10/255 |
| 2017/0344851 A1* | 11/2017 | Naitou | ..................... | G07G 1/01 |
| 2018/0068168 A1 | 3/2018 | Miyakoshi et al. | | |
| 2018/0114184 A1* | 4/2018 | Brooks | .................. | G01G 23/18 |
| 2019/0026718 A1* | 1/2019 | Iizaka | .................. | G07G 1/0054 |
| 2019/0114488 A1* | 4/2019 | Glazer | .................... | G06Q 20/20 |
| 2019/0172039 A1* | 6/2019 | Kambara | ............... | G06V 20/52 |
| 2019/0213545 A1* | 7/2019 | Adato | ............ | G06Q 10/063112 |
| 2019/0220692 A1* | 7/2019 | Wu | .......................... | G06N 3/08 |
| 2019/0231094 A1* | 8/2019 | Pan | ...................... | G06Q 20/208 |
| 2020/0151692 A1 | 5/2020 | Gao et al. | | |
| 2020/0265494 A1* | 8/2020 | Glaser | .................... | G06V 20/20 |
| 2020/0273013 A1* | 8/2020 | Garner | ................... | G06Q 20/12 |
| 2021/0082024 A1* | 3/2021 | Sivan | ..................... | G06K 7/1417 |
| 2021/0304173 A1* | 9/2021 | Rodriguez | ............. | G07G 3/003 |
| 2021/0326370 A1* | 10/2021 | Cui | ....................... | G06F 16/383 |
| 2022/0405822 A1* | 12/2022 | Iwamoto | ............... | G06Q 30/02 |

FOREIGN PATENT DOCUMENTS

| | | |
|---|---|---|
| JP | 2013-109539 | 6/2013 |
| JP | 2018-055716 | 4/2018 |

OTHER PUBLICATIONS

Extended European Search Report issued in European Patent Application No. 21811880.0, dated Jul. 3, 2023.

* cited by examiner

ORDER MANAGEMENT DEVICE AND ORDER MANAGEMENT METHOD

TECHNICAL FIELD

The present disclosure relates to an order management apparatus and an order management method.

BACKGROUND ART

In a retail store such as a supermarket or a convenience store, a method for identifying merchandise items by image recognition for checkout has been studied (for example, see Patent Literature (hereinafter, referred to as "PTL") 1 or 2).

CITATION LIST

Patent Literature

PTL 1
  Japanese Patent Application Laid-Open No. 2013-109539
PTL 2
  Japanese Patent Application Laid-Open No. 2018-055716

SUMMARY OF INVENTION

However, there is scope for further improvement in a method for reducing the erroneous recognition rate of image recognition of a combination of articles. In particular, a method for preventing erroneous recognition at a point of time when an article is ordered has not been studied in the past.

One non-limiting exemplary embodiment of the present disclosure facilitates providing an order management apparatus and a merchandise item management method capable of reducing an erroneous recognition rate of image recognition of a combination of articles.

An order management apparatus according to one exemplary embodiment of the present disclosure includes: input circuitry, which, in operation, obtains information on a plurality of articles including a candidate for an article to be ordered, the plurality of articles being to be a target of image recognition after the candidate for the article to be ordered is ordered; control circuitry, which, in operation, determines an index indicating a probability that two or more different articles included in the plurality of articles are erroneously recognized as identical articles during the image recognition of the two or more different articles, the determining being based on information on a similarity degree of the plurality of articles in the image recognition; and output circuitry, which, in operation, outputs information on the determined index before the candidate for the article to be ordered is ordered.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one exemplary embodiment of the present disclosure, it is possible to reduce an erroneous recognition rate of image recognition of a combination of articles.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
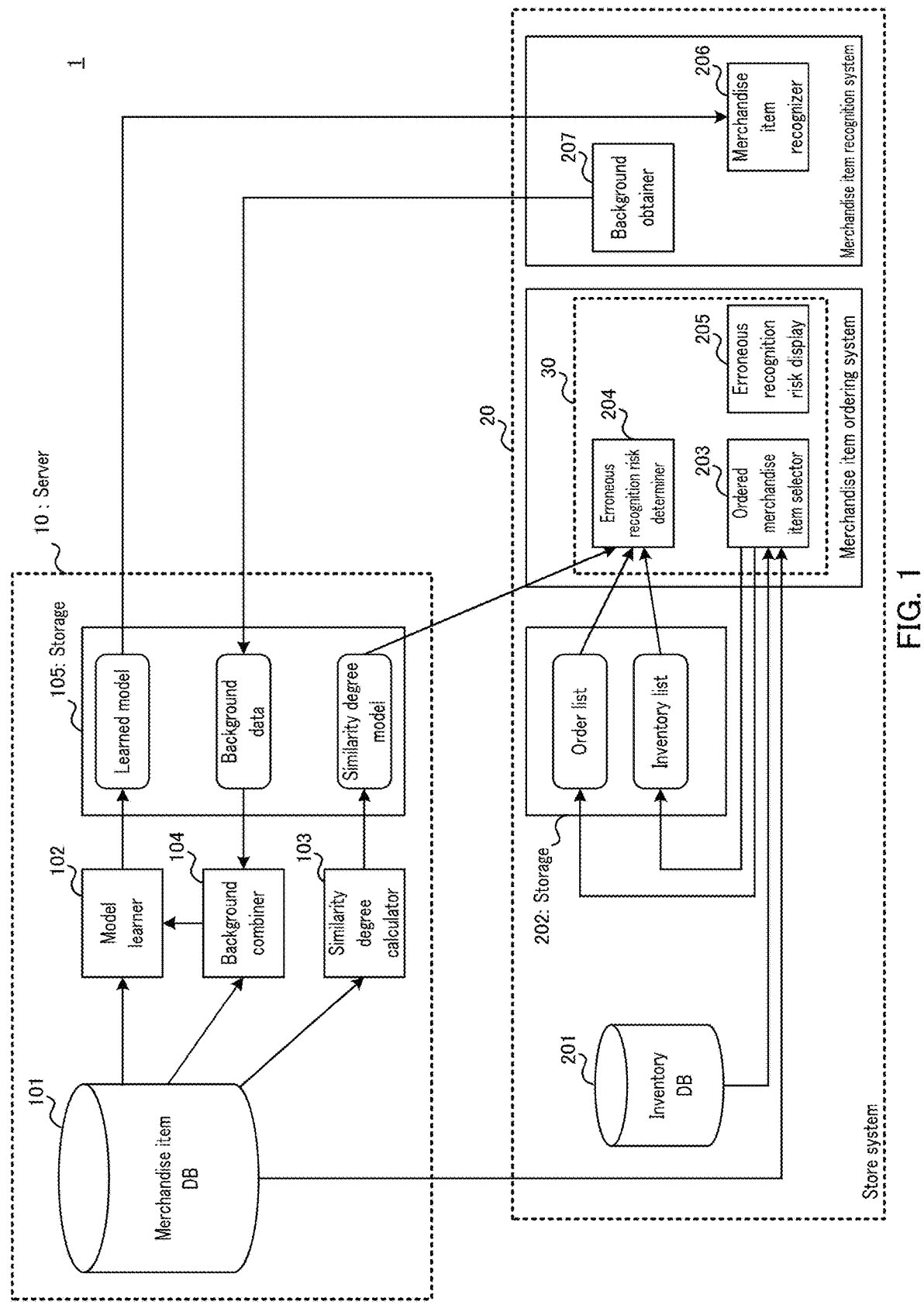
FIG. 1 is a diagram illustrating an example of a configuration of a merchandise item management system.

Hereinafter, embodiments of the present disclosure will be described in detail with reference to the accompanying drawings.

For example, a system for recognizing a merchandise item by image recognition at a checkout table (or a register) installed in a retail store, and automatically performing checkout for the recognized merchandise item has been studied. By automating merchandise item checkout by the image recognition, for example, an effect of cost cutting is expected that results from an increase in customer turnover rate or reduction of workload of a store clerk.

Meanwhile, there is a possibility that erroneous recognition of a merchandise item may occur in image recognition at the time of checkout. When erroneous recognition of a merchandise item occurs at the time of checkout, for example, manual processing by a customer or a store clerk may occur, and thus the above-described cost-cutting effect may be reduced. Further, for example, when the price of another merchandise item that the system erroneously recognizes for the merchandise item is lower than the price of the merchandise item that the customer checks out for, the sales of the store may be affected if the customer checks out without correcting the erroneous recognition of the item.

For example, as a method for suppressing occurrence of erroneous recognition of a merchandise item at the time of checkout, there is a method for reconstructing an image recognition model (hereinafter, also referred to as a "recognition model") of the merchandise item based on image data (for example, including a merchandise item image or a background image) of a checkout place (for example, a checkout table in a store) in which the erroneous recognition has occurred, and evaluating the recognition model using a test data. By this method, for example, the recognition model corresponding to the environment of the store is constructed, and the accuracy of image recognition can be improved.

However, it can be assumed that an enormous number of (e.g., several thousands or several tens of thousands of) merchandise items are handled in the store. In addition, a risk of occurrence of erroneous recognition of a merchandise item in image recognition (hereinafter, referred to as "erroneous recognition risk") may differ depending on a combination of merchandise items. Therefore, for example, it is highly likely that it takes a long time to collect and create test data for reconstruction and evaluation of the recognition model, and it is likely that the erroneous recognition risk of the merchandise item at the time of checkout cannot be reduced until the evaluation of the recognition model is completed.

In addition, for example, there may be a method in which a person such as a store clerk or an owner of a store determines the erroneous recognition risk based on an image of a merchandise item. However, the impression of the merchandise item image viewed by the human eyes does not necessarily coincide with the result of the image recognition. In addition, there is a possibility that a person who does not sufficiently have the technical knowledge of image recognition, such as a store clerk or an owner of a store, cannot judge the erroneous recognition risk in image recognition.

In view of the above, one exemplary embodiment of the present disclosure will be described in which a method for judging an erroneous recognition risk of a merchandise item and suppressing erroneous recognition of the merchandise item at the time of checkout.

Embodiment 1

[Configuration of Merchandise Item Management System]

FIG. 1 is a diagram illustrating a configuration example of merchandise item management system 1 according to the present embodiment.

Merchandise item management system 1 illustrated in FIG. 1 includes, for example, server 10 and store system 20. Store system 20 may be configured on a store-by-store basis, for example.

Server 10 and store system 20 may be connected via a communication network such as a radio network or a wired network, for example. Server 10 may be installed in a store or may be installed outside the store.

Server Configuration Example

Server 10 illustrated in FIG. 1 may include, for example, merchandise item database (DB) 101, model learner 102, similarity degree calculator 103, background combiner 104, and storage 105.

Merchandise item DB 101 stores, for example, information about merchandise items that can be handled in the store. The information on the merchandise items may include, for example, information identifying the merchandise items (for example, a merchandise item name or a merchandise item ID), information on the prices of the merchandise items, and merchandise item image data.

For example, model learner 102 may learn models of the merchandise items based on the information about the merchandise items stored in merchandise item DB 101. Model learner 102 may also learn the merchandise item models, for example, based on the merchandise item image data (for example, the merchandise item image data combined with the background image data) inputted by background combiner 104. For example, model learner 102 may output a recognition model obtained by model learning (hereinafter, also referred to as a learned model) to storage 105.

For example, similarity degree calculator 103 may calculate (or determine) a similarity degree between different merchandise items based on the merchandise item image data stored in merchandise item DB 101. For example, similarity degree calculator 103 may output information on the calculated similarity degree (hereinafter, also referred to as a similarity degree model) to storage 105.

Here, for example, a similarity degree (for example, a cosine similarity degree) between feature vectors related to the merchandise items may be applied as the similarity degree of the merchandise items calculated by similarity degree calculator 103. Note that the similarity degree of the merchandise items is not limited to the cosine similarity degree, and other similarity degrees may be applied. The similarity degree of the merchandise items may be expressed in a range of 0 to 1, for example, and the similarity degree of the merchandise items may be larger as the merchandise items become more similar to each other.

Figure 2:
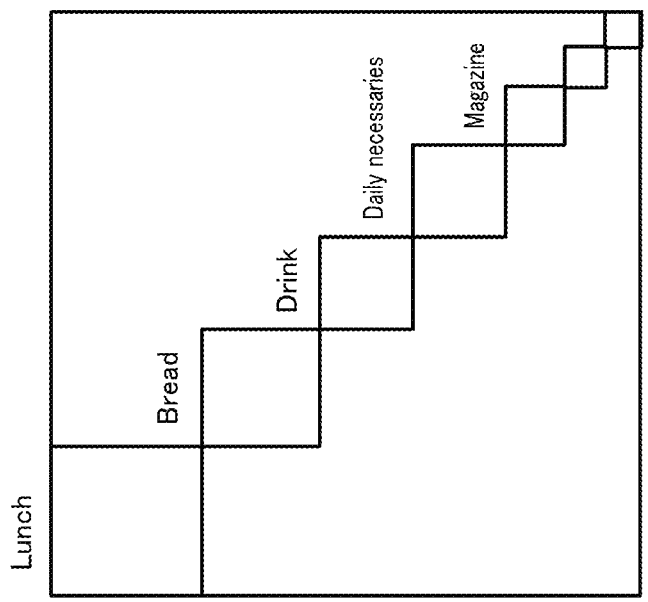
FIG. 2 is a diagram illustrating an example of calculation of a similarity degree.

Further, for example, as illustrated in FIG. 2, similarity degree calculator 103 may calculate a similarity degree between merchandise items belonging to a similar category (for example, a category such as a lunch, a bread, a drink, daily necessaries, or a magazine) among a plurality of merchandise items stored in merchandise item DB 101. In other words, for example, similarity degree calculator 103 may set, to 0 without calculation, the similarity degree between merchandise items belonging to different categories among the plurality of merchandise items stored in merchandise item DB 101. By this method for calculating the similarity degree, it is possible to reduce the similarity degree calculation process.

Background combiner 104 may combine, for example, the merchandise item image data stored in merchandise item DB 101 and the background image data inputted by storage 105. Background combiner 104 may output the merchandise item image data combined with the background to model learner 102.

Storage 105 may store, for example, the learned models inputted by model learner 102, the similarity degree model inputted by similarity degree calculator 103, and the background image data transmitted by store system 20.

Store System Configuration Example

Store system 20 illustrated in FIG. 1 may include, for example, inventory DB 201, storage 202, ordered merchandise item selector 203, erroneous recognition risk determiner 204, erroneous recognition risk display 205, merchandise item recognizer 206, and background obtainer 207.

In FIG. 1, ordered merchandise item selector 203, erroneous recognition risk determiner 204 (corresponding to, for example, the control circuitry), and erroneous recognition risk display 205 (corresponding to, for example, the output circuitry) may be included in a merchandise item ordering system that performs, for example, an ordering process for ordering a merchandise item. Further, ordered merchandise item selector 203, erroneous recognition risk determiner 204, and erroneous recognition risk display 205 may constitute, for example, order management apparatus 30.

Further, in FIG. 1, merchandise item recognizer 206 and background obtainer 207 may be included in a merchandise item recognition system that performs a recognition process on a merchandise item at the time of checkout, for example.

Inventory DB 201 may store, for example, information on an inventory of merchandise items in a store provided with store system 20.

Storage 202 may store, for example, information on an ordered merchandise item (hereinafter also referred to as an order list) and information on an in-stock merchandise item (hereinafter also referred to as an inventory list) inputted by ordered merchandise item selector 203.

Ordered merchandise item selector 203 may select the ordered merchandise item (candidate for a merchandise item to be ordered) based on, for example, information on merchandise items stored in merchandise item DB 101 and information on in-stock merchandise items stored in inventory DB 201. Ordered merchandise item selector 203 may determine the ordered merchandise item and the number of orders by, for example, an operation by a user such as an ordering person or an owner of a store. Alternatively, ordered merchandise item selector 203 may determine the ordered merchandise item and the number of orders according to, for example, the number of in-stock merchandise items (or the number of out-of-stock merchandise items).

Ordered merchandise item selector 203 may output the order list and the inventory list to storage 202, for example, based on selected ordered merchandise items. Ordered merchandise item selector 203 may change the ordered merchandise items, for example, based on a judgement result on an erroneous recognition risk to be described later. In other words, ordered merchandise item selector 203 may update the order list and the inventory list stored in storage 202.

For example, erroneous recognition risk determiner 204 may judge (or determine) an erroneous recognition risk with respect to a merchandise item (for example, a candidate for a merchandise item to be ordered (hereinafter, referred to as an ordered merchandise item candidate)) included in the order list stored in storage 202. For example, based on the similarity degree model stored in server 10, erroneous recognition risk determiner 204 may judge an index (hereinafter, simply referred to as "erroneous recognition risk") relating to the accuracy of image recognition of a merchandise item pair (or a combination of merchandise items) including at least one ordered merchandise item candidate in a plurality of merchandise items (for example, merchandise items included in each of the order list and the inventory list).

Erroneous recognition risk display (or output) 205 may display (or output) information on the erroneous recognition risk judged by erroneous recognition risk determiner 204, for example. One example of a method for displaying the erroneous recognition risk on erroneous recognition risk display 205 will be described later.

Merchandise item recognizer 206 may recognize an image of a merchandise item that a customer of a store checks out for (e.g., purchases), for example. For example, merchandise item recognizer 206 may obtain merchandise item image data that is captured by a camera (not illustrated) and that is of a merchandise item existing at a place where image recognition is performed at the time of checkout, such as a checkout table. Merchandise item recognizer 206 may recognize the merchandise item corresponding to the merchandise item image data, for example, based on the learned model of the merchandise item stored in server 10.

Background obtainer 207 obtains, for example, image data (for example, background image data) that does not include any merchandise item in the place (for example, a checkout table) where the image recognition by merchandise item recognizer 206 is performed. For example, background obtainer 207 may obtain the background image data based on an instruction from order management apparatus 30. Then, background obtainer 207 transmits the obtained background image data to server 10.

[Example of Operation of Merchandise Item Management System]

Next, one example of the operation of above-described merchandise item management system 1 will be described.

Figure 3:
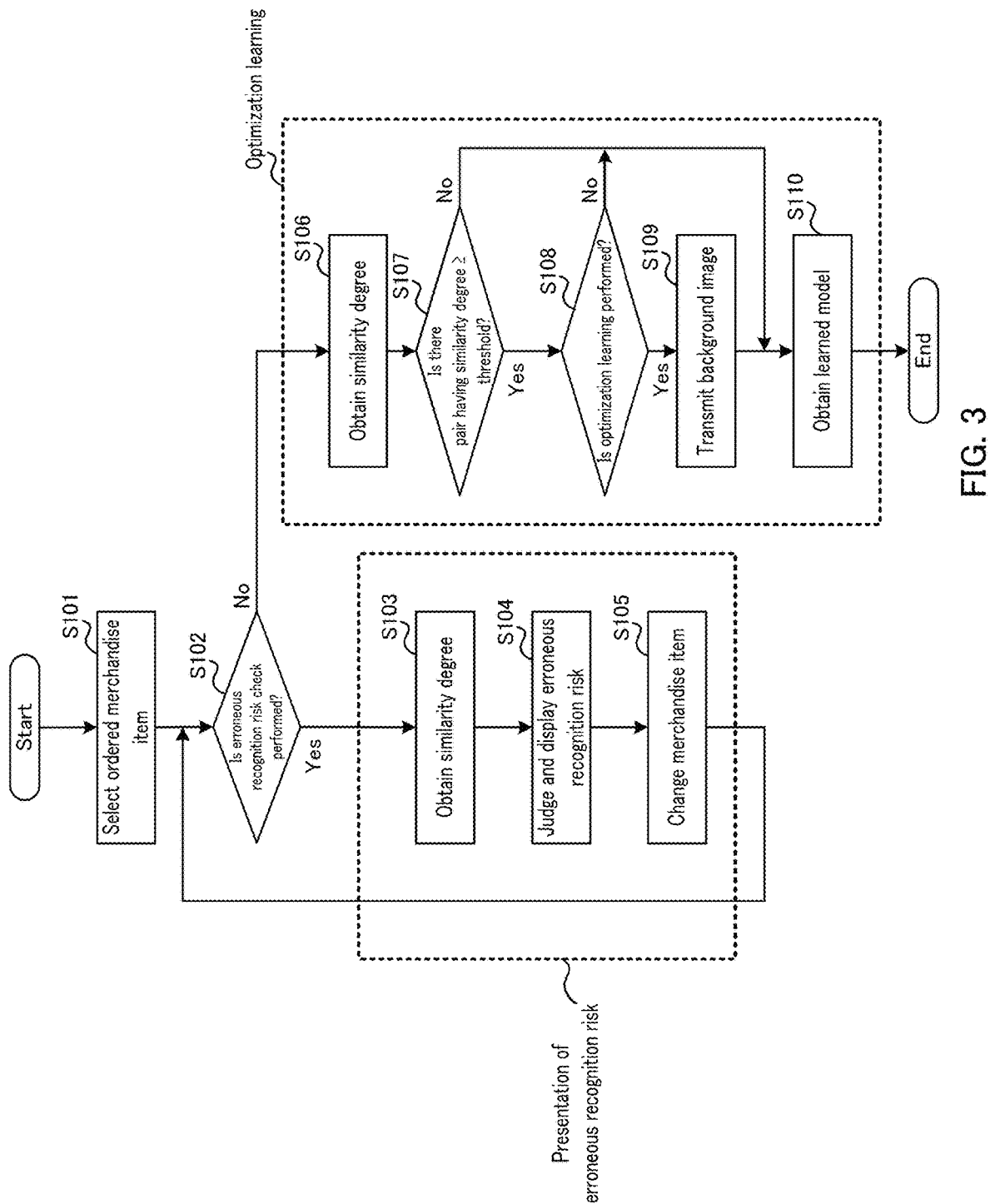
FIG. 3 is a flowchart illustrating an example of operation of the merchandise item management system.

FIG. 3 is a flowchart illustrating an operation example of merchandise item management system 1.

In FIG. 3, order management apparatus 30 may select an ordered merchandise item (for example, an ordered merchandise item candidate) (S101), for example. The ordered merchandise item candidate may be selected by, for example, a user (for example, an ordering person). In this case, order management apparatus 30 may, for example, display an image indicating information about orderable merchandise items on a display (not illustrated in FIG. 1) and wait for user's selection.

Figure 4:
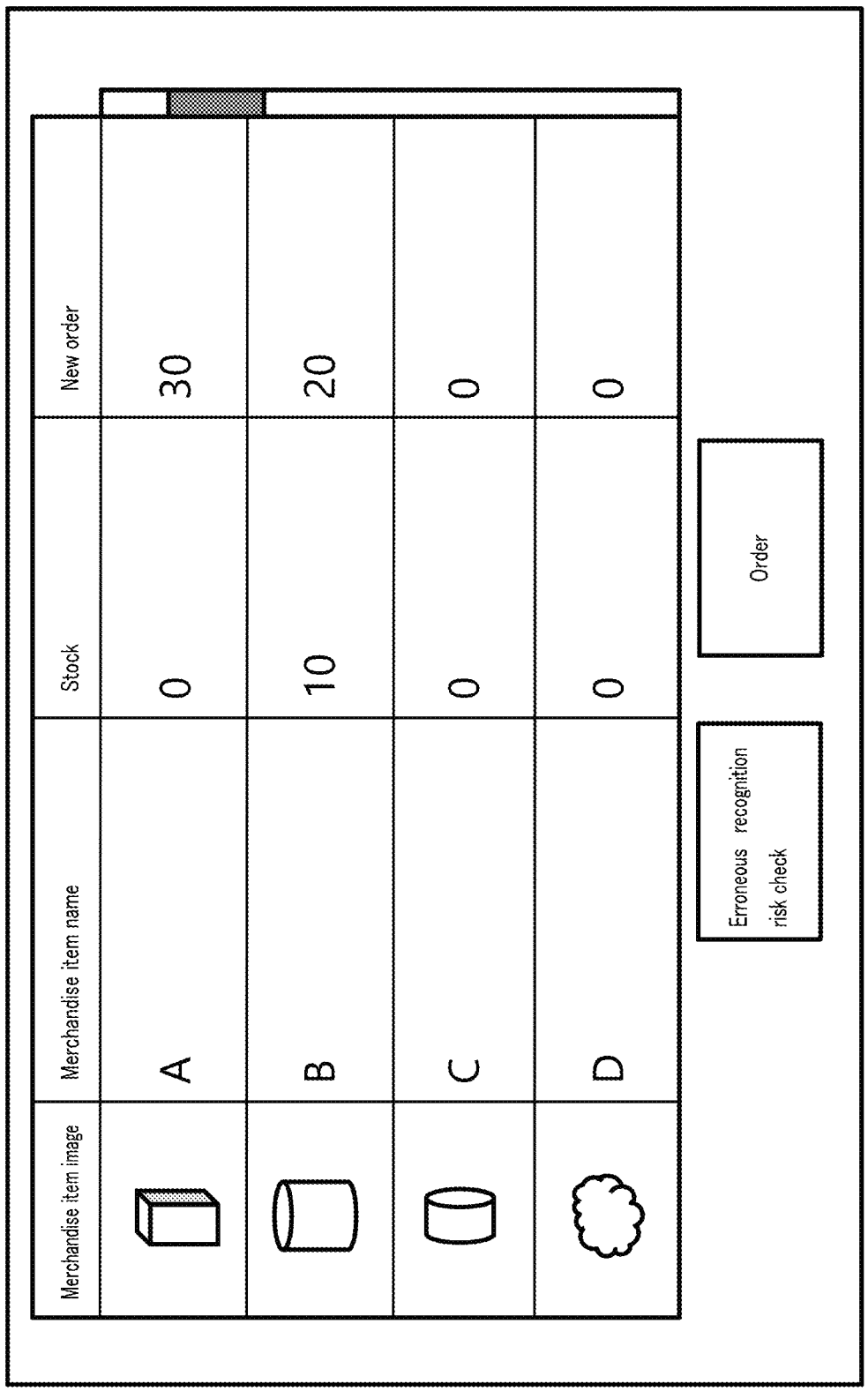
FIG. 4 is a diagram illustrating one example of a display screen relating to a merchandise item selecting process.

FIG. 4 is a diagram illustrating one example of a display screen at the time of selection of ordered merchandise items. On the screen illustrated in FIG. 4, for example, a merchandise item image, a merchandise item name, the number of stocks, and the number of orders may be shown. For example, the user may input the number of new orders based on merchandise item images, merchandise item names, and the number of stocks illustrated in FIG. 4. Note that the information on merchandise items displayed during selection of the ordered merchandise items is not limited to the information illustrated in FIG. 4, and may be other information.

Further, the screen illustrated in FIG. 4 may include, for example, a button (for example, referred to as an "order button") for starting the ordering process. Order management apparatus 30 may start the ordering process of the selected ordered merchandise item, for example, when press of the order button by the user is detected.

Further, the screen illustrated in FIG. 4 may include, for example, a button (for example, referred to as an "erroneous recognition risk check button") for starting a judging process of judging the erroneous recognition risk for the ordered merchandise item candidate. Order management apparatus 30 may perform the judging process of judging the erroneous recognition risk for the ordered merchandise item candidate, for example, when the press of the erroneous recognition risk check button by the user is detected.

For example, in FIG. 3, order management apparatus 30 determines whether or not to perform the erroneous recognition risk check (S102). For example, order management apparatus 30 may determine whether or not to perform the erroneous recognition risk check based on whether or not the erroneous recognition risk check button illustrated in FIG. 4 is pressed by the user.

When performing the erroneous recognition risk check (S102: Yes), order management apparatus 30 may perform, for example, processes related to the erroneous recognition risk (for example, presentation and/or merchandise item change) (for example, processes of from S103 to S105). In addition, when the erroneous recognition risk check is not performed (S102: No), order management apparatus 30 may perform, for example, processes related to optimization learning (for example, processes of from S106 to S110). As will be described in detail later, the optimization learning is a process of performing learning for improving the accuracy of recognition of a specific merchandise item depending on an actual environment. Note that the case in which the erroneous recognition risk check is not performed may be, for example, a case in which order management apparatus 30 detects the press of the "order" button by the user on the display screen displaying the order list as illustrated in FIG. 4.

[Processing Relevant to Erroneous Recognition Risk]

Order management apparatus 30 may obtain, for example, a similarity degree between ordered merchandise item candidates and other merchandise items (S103). For example, order management apparatus 30 may obtain, from server 10, a similarity degree of a merchandise item pair including at least one ordered merchandise item candidate among a plurality of merchandise items including ordered merchandise item candidates and in-stock merchandise items.

In FIG. 3, for example, order management apparatus 30 may judge an erroneous recognition risk and display a judgement result on the erroneous recognition risk (S104).

Order management apparatus 30 may judge the erroneous recognition risk based on, for example, the similarity degree of the obtained merchandise items. For example, order management apparatus 30 may set, as the erroneous recognition risk ([%]), a value obtained by multiplying the similarity degree in the range of 0 to 1 by 100. Note that, the method for judging the erroneous recognition risk is not limited to this method.

Figure 5:
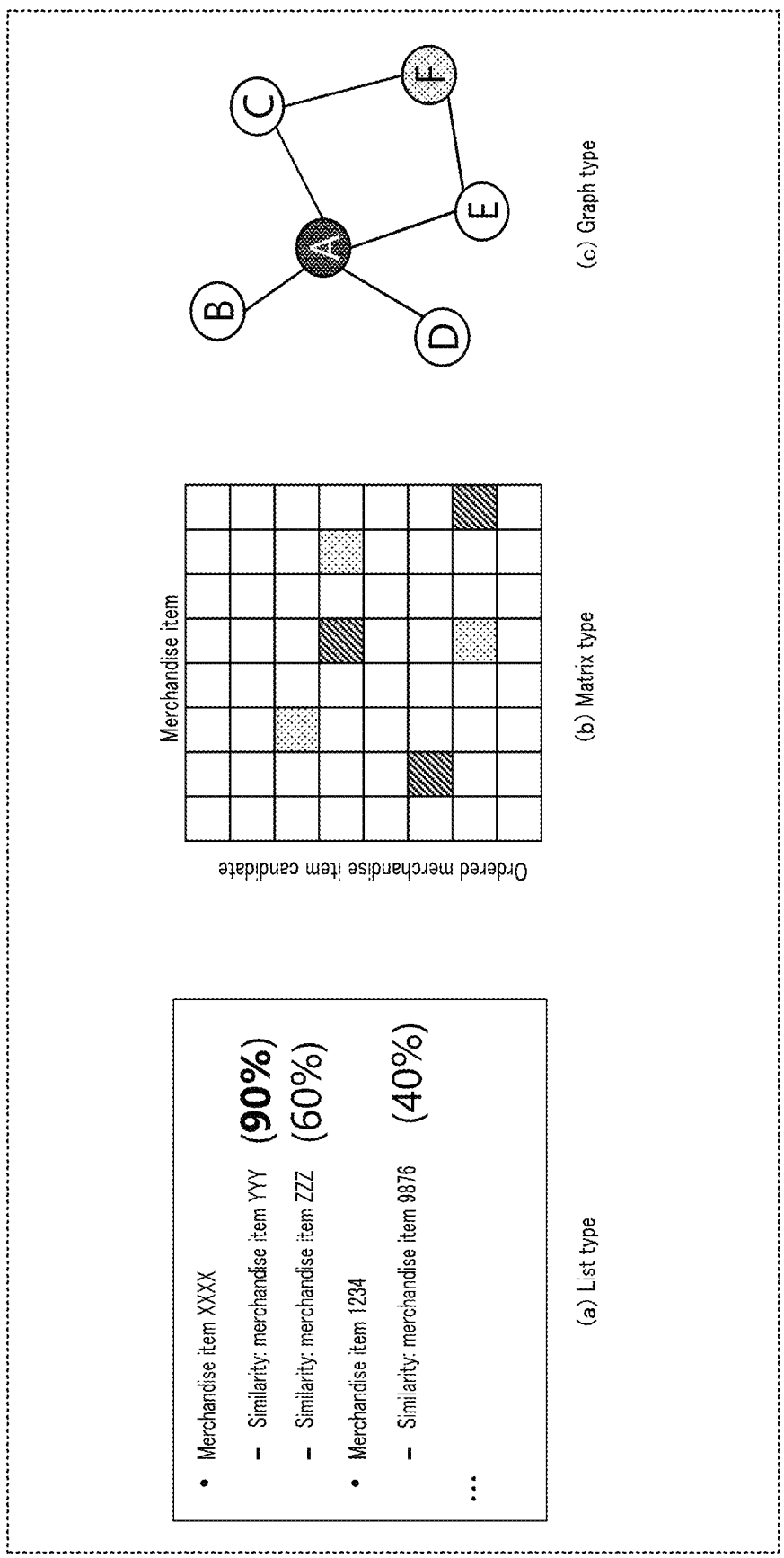
FIG. 5 is a diagram illustrating an example of display of erroneous recognition risk.

Portions (a), (b), and (c) of FIG. 5 illustrate one examples of a displaying method for displaying an erroneous recognition risk.

Portion (a) of FIG. 5 illustrates an example in which the erroneous recognition risks are displayed in a list format (for example, referred to as a "list type"). As illustrated at portion (a) of FIG. 5, for each of the ordered merchandise item candidates (for example, merchandise item XXXX and merchandise item 1234), the erroneous recognition risk in relation to other merchandise items may be displayed.

Portion (b) of FIG. 5 illustrates an example of displaying the erroneous recognition risks in a matrix format (for example, referred to as a "matrix type"). Here, at portion (b) of FIG. 5, the merchandise items are associated with respective divisions on the vertical axis and the horizontal axis, and erroneous recognition risks of combinations of the merchandise items are displayed at intersections, respectively. That is, in the matrix type, a pair of each ordered merchandise item candidate and another merchandise item may be represented as each cell in the matrix.

Portion (c) of FIG. 5 illustrates an example in which the erroneous recognition risks are displayed in a graph format (for example, referred to as a "graph type"). As illustrated at portion (c) of FIG. 5, for example, nodes (circular portions) indicating a plurality of merchandise items (at portion (c) of FIG. 5, for example, merchandise items A to F) including an ordered merchandise item candidate may be connected by lines to represent merchandise items with an erroneous recognition risk equal to or higher than a threshold. In addition, not only merchandise items with an erroneous recognition risk being equal to or higher than the threshold, but also all merchandise items may be displayed while connected by the lines. In this case, the level of the erroneous recognition risk may be distinguishingly expressed by changing the aspect (color, thickness, shape, etc.) of the lines.

Note that, in portions (a), (b), and (c) of FIG. 5, the merchandise item pair for which an erroneous recognition risk equal to or higher than the specified threshold is calculated may be displayed in an emphasized manner. Further, for example, as illustrated at portion (a) of FIG. 5, the display order may be such that a similar merchandise item with a high erroneous recognition risk with respect to the ordered merchandise item candidate is displayed earlier.

Further, the color of the character may be changed according to the similarity degree such that the level of the similarity degree can be easily grasped intuitively. Further, for example, as illustrated in portions (b) or (c) of FIG. 5, the display mode (for example, the color, the shape, the thickness of the line, or the size) may be changed in accordance with the erroneous recognition risk. At portion (b) of FIG. 5, the erroneous recognition risks of combinations of the merchandise items are displayed by color in cells located at the intersections of the merchandise items on the horizontal axis and the merchandise items on the vertical axis. Further, at portion (c) of FIG. 5, the node indicating each of the merchandise items is displayed in different colors according to the magnitude of total values of erroneous recognition risks between the merchandise item and the connected merchandise items. As a result, it is possible to visually recognize a merchandise item that if changed or deleted, is likely to cause a reduction of the erroneous recognition risk.

Note that, the erroneous recognition risk may be emphasized by reflecting, to the node indicating each merchandise item, the highest erroneous recognition risk among the erroneous recognition risks of the merchandise item with respect to other merchandise items, or by changing the aspect (color, thickness, shape, etc.) of the lines connecting between the nodes. In this case, it becomes easier to recognize a combination of merchandise items with a high erroneous recognition risk. Such emphasis is thus useful when considering to exclude or change a plurality of merchandise items. In addition, it may be made possible to switch between the use of the list type, the use of the matrix type, and the use of the graph type, or to switch between the aspects of emphasized display in the same display mode.

By displaying the erroneous recognition risks as illustrated at portion (a), (b), and (c) of FIG. 5, the user can comprehensively check, for example, a merchandise item pair with a high erroneous recognition risk (for example, a merchandise item pair with an erroneous recognition risk equal to or higher than a threshold).

Further, in the list type display illustrated at portion (a) of FIG. 5, the erroneous recognition risk of each merchandise item can be displayed in detail as illustrated at portion (a) of FIG. 5. In addition, since results are enumerated as text strings, it becomes possible to obtain the output results in a short time.

In addition, the matrix type display of the erroneous recognition risks illustrated at portion (b) of FIG. 5 makes it easier for the user to select, for example, a merchandise item that is to be changed in a merchandise item changing process to be described later. In addition, in the matrix type display, it is possible to comprehensively check erroneous recognition risks of from a merchandise item with a high erroneous recognition risk to a merchandise item with a relatively low erroneous recognition risk.

In addition, the graph type display of the erroneous recognition risks illustrated at portion (c) of FIG. 5 makes it possible to easily check the relevance between the merchandise items with a high erroneous recognition risk. Further, the graph type display allows the user to intuitively check, for example, a merchandise item that is likely to be erroneously recognized as another merchandise item (in other words, a merchandise item that is a bottleneck for recognition accuracy) among a merchandise item group (for example, ordered merchandise items and in-stock merchandise items) exhibited in the store. For example, in the example of portion (c) of FIG. 5, merchandise item A represents an example in which the erroneous recognition risk of merchandise item A with respect to each of four other merchandise items B, C, D, and E (for example, in-stock merchandise items) is equal to or higher than the threshold, and merchandise item F represents an example in which the erroneous recognition risk of merchandise item F with respect to each of two other merchandise items D and E is equal to or higher than the threshold. For example, at portion (c) of FIG. 5, the user can determine that merchandise item A is possibly a bottleneck merchandise item.

In the display of the erroneous recognition risk, order management apparatus 30 may display, for example, a merchandise item pair with an erroneous recognition risk being equal to or higher than a threshold. In other words, order management apparatus 30 may hide, for example, a merchandise item pair with an erroneous recognition risk being lower than the threshold. Alternatively, for example, order management apparatus 30 may weakly display the merchandise item pair with an erroneous recognition risk being lower than the threshold. As an example of the weak display, diluting the color of the display or using a broken line or the like for a portion of a line to be weakly displayed if any line is included in the display is conceivable.

Figure 6:
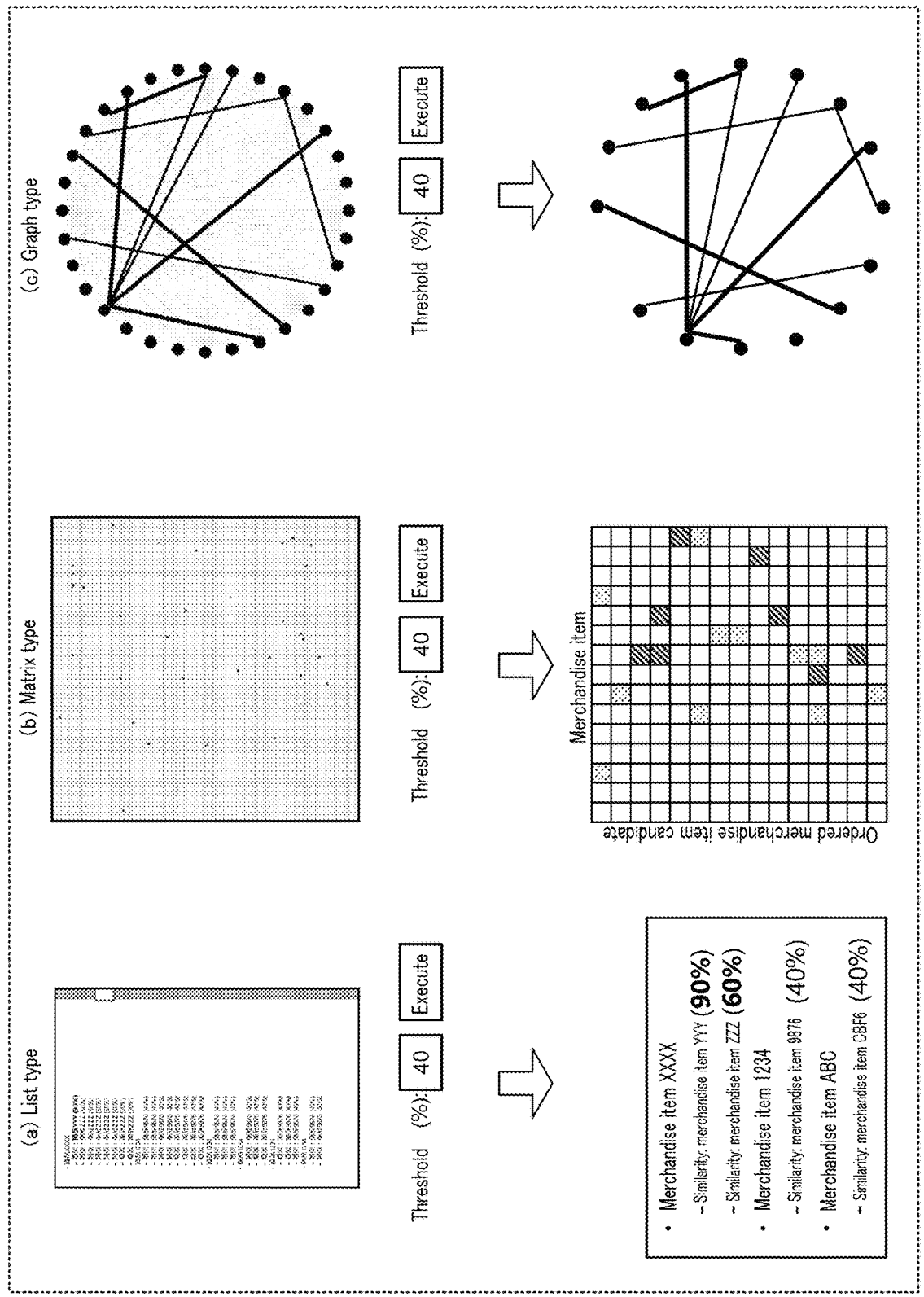
FIG. 6 is a diagram illustrating an example of display of the erroneous recognition risk.

Portions (a), (b), and (c) of FIG. 6 illustrate one exemplary cases where merchandise item pairs with an erroneous recognition risk being equal to or higher than 40% (in other words, threshold=40%) are displayed in the display formats of the list type, the matrix type, and the graph type. Thus, even when a large number of merchandise items are handled in the store, order management apparatus 30 displays, for example, merchandise items with an erroneous recognition risk being equal to or higher than the threshold without displaying merchandise items with an erroneous recognition risk being lower than the threshold. Thus, it is possible to improve the visibility for the user to see the display of the erroneous recognition risk. Note that the threshold may be capable of being set in accordance with user's selection, or an average value or a median value of erroneous recognition risks of all merchandise item pairs may be used. In the former case, it is possible to accurately grasp the intention of the user, and in the latter case, it is possible to grasp whether or not the erroneous recognition risk of each merchandise item pair is relatively high.

In FIG. 3, for example, order management apparatus 30 may control order placement for ordered merchandise item candidates included in merchandise item pairs with an erroneous recognition risk being equal to or higher than a threshold (S105). The order control may include, for example, a merchandise item changing process or an order cancellation process based on the similarity degrees of a plurality of merchandise items. For example, order management apparatus 30 may perform the merchandise item changing process based on a user's selection operation (in other words, manual processing) or may automatically perform the merchandise item changing process (in other words, automatic processing).

Hereinafter, one example of the merchandise item changing process in order management apparatus 30 will be described.

For example, an example of the manual processing of the merchandise item change will be described. Portions (a), (b), and (c) of FIG. 7 illustrate one example of a display screen related to the merchandise item changing process.

Figure 7:
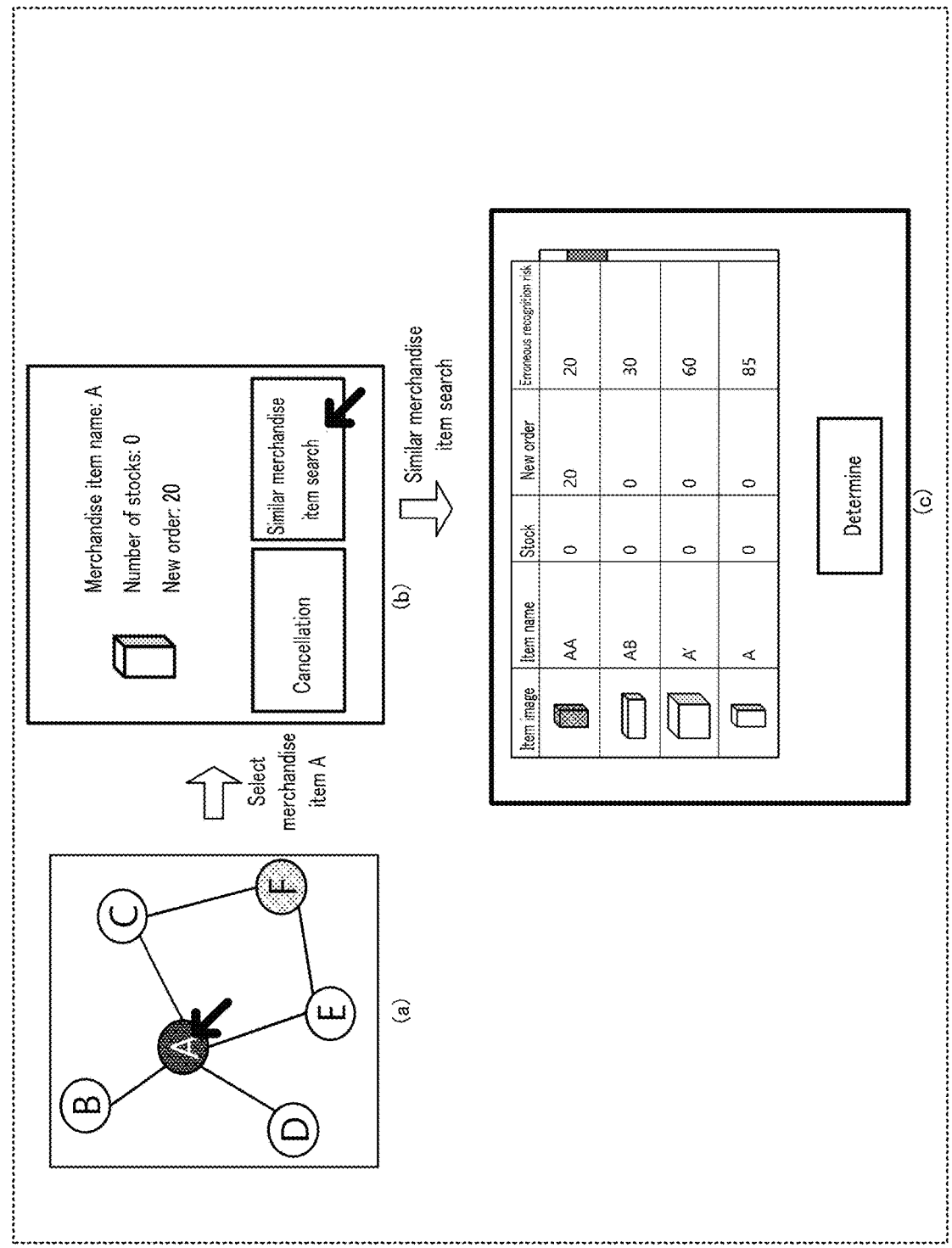
FIG. 7 is a diagram illustrating an example of display related to a merchandise item changing process.

For example, the user selects merchandise item A on the erroneous-recognition-risk display screen (for example, the graph type) as illustrated at portion (a) of FIG. 7. In this case, for example, as illustrated at portion (b) of FIG. 7, order management apparatus 30 may display information on merchandise item A (for example, the merchandise item name, the number of stocks, and the number of new orders) and buttons (for example, a similar merchandise item search button and a cancellation button) for starting processes related to the merchandise item change.

At portion (b) of FIG. 7, order management apparatus 30 may display information on merchandise items similar to merchandise item A (hereinafter, referred to as similar merchandise items), for example, when the press of the similar merchandise item search button by the user is detected. The similar merchandise items may be, for example, merchandise items of a similarity degree equal to or higher than a threshold with respect to the ordered merchandise item candidate. Further, the information on the similar merchandise items (at portion (c) of FIG. 7, merchandise item AA, merchandise item AB, and merchandise item A') may include, for example, information indicating the merchandise item names, the number of stocks, the number of new orders, and the erroneous recognition risks. Further, at portion (c) of FIG. 7, information regarding merchandise item A to be changed may also be displayed.

For example, the user may select a merchandise item to be ordered, from among merchandise item A and the similar merchandise items similar to merchandise item A. In the example illustrated at portion (c) of FIG. 7, instead of merchandise item A, merchandise item AA with an erroneous recognition risk of 20 (for example, the smallest erroneous recognition risk at portion (c) of FIG. 7) is selected. For example, at portion (c) of FIG. 7, order management apparatus 30 determines the change of the ordered merchandise item candidate from merchandise item A to merchandise item AA similar to merchandise item A based on the selection by the user.

Further, at portion (b) of FIG. 7, when order management apparatus 30 detects that the user presses the cancellation button, for example, the order cancellation process for canceling the order for merchandise item A may be performed (not illustrated). For example, order management apparatus 30 may exclude the cancellation-target merchandise item from the ordered merchandise item candidates (for example, an order list).

Note that, at portion (b) of FIG. 7, when detecting that the user presses the cancellation button, order management apparatus 30 may display, for example, an erroneous recognition risk (for example, the highest erroneous recognition risk) for another ordered merchandise item candidate different from the cancellation-target merchandise item.

As described above, order management apparatus 30 displays the erroneous recognition risk of each of the merchandise items with an erroneous recognition risk equal to or higher than the threshold and the similar merchandise items similar to the merchandise item. The display of the erroneous recognition risk allows the user to select, for example, a change to a merchandise item with a lower erroneous recognition risk or cancellation of placing an order. It is thus possible to reduce an order for a merchandise item with a high erroneous recognition risk in placement of an order for the merchandise item group exhibited in a store. In other words, it is possible to provide the merchandise item group with a low erroneous recognition risk in image recognition at the time of checkout. Therefore, for example, it is possible to reduce erroneous recognition of a merchandise item at the time of checkout by a customer.

Next, for example, an example of the automatic processing of the merchandise item change will be described. Portions (a) and (b) of FIG. 8 illustrate one example of the automatic processing of the merchandise item change.

Figure 8:
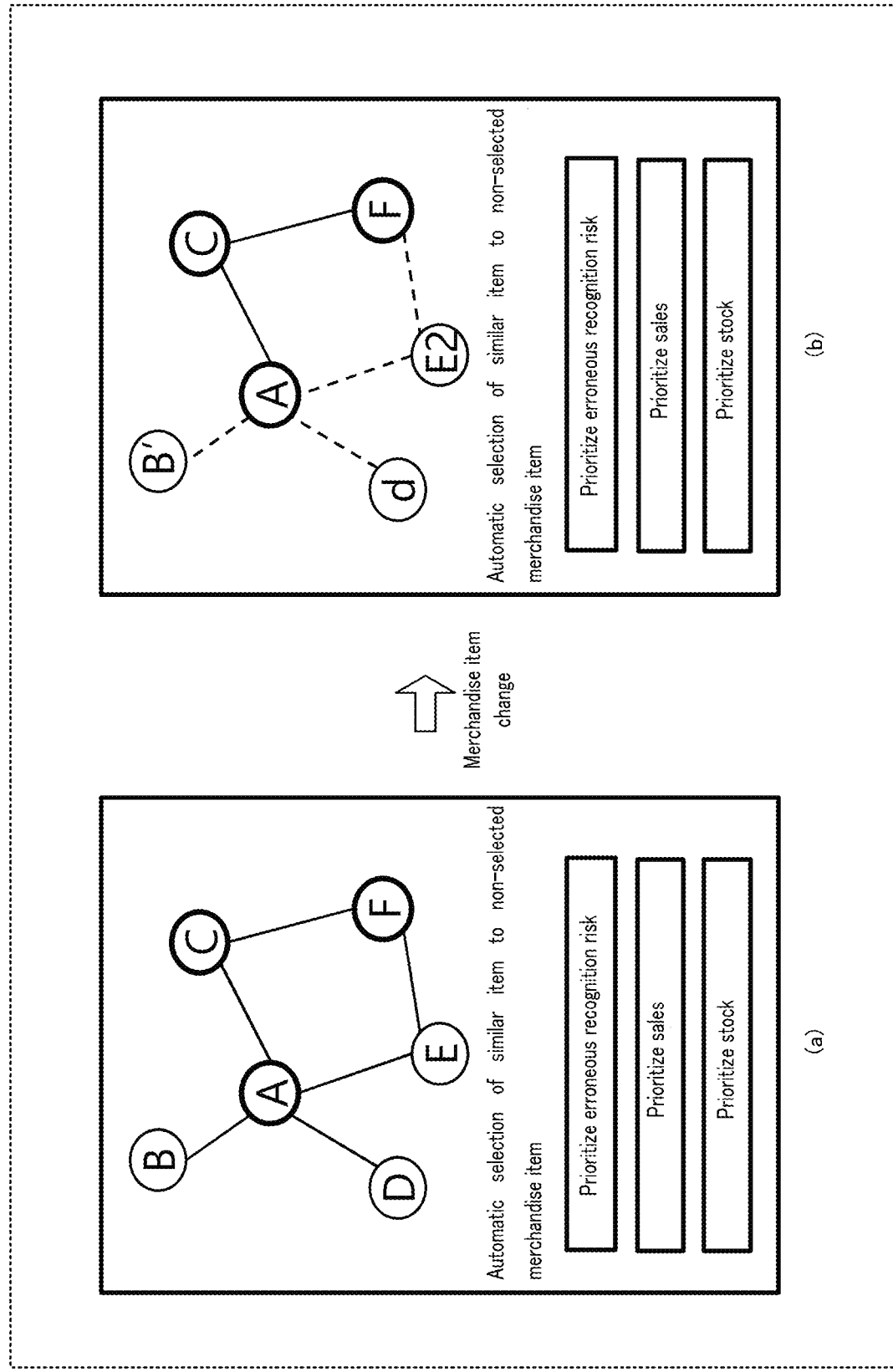
FIG. 8 is a diagram illustrating an example of display related to the merchandise item changing process.

For example, as illustrated at portion (a) of FIG. 8, order management apparatus 30 may display, on an erroneous-recognition-risk display screen (for example, the graph type), buttons for the user to select a priority for automatic selection of a similar merchandise item similar to a changed-target merchandise item. At portion (a) of FIG. 8, by way of example, the button "Prioritize erroneous recognition risk" for selection of a similar merchandise item by which the erroneous recognition risk is preferentially reduced, the button "Prioritize sales" for selection of a similar merchandise item by which the sales of the merchandise item is preferentially increased, and the button "Prioritize stock" for selection of a similar merchandise item by which an in-stock merchandise item is preferentially selected are displayed. Note that the priorities in the automatic selection of the similar merchandise item are not limited to those illustrated at portion (a) of FIG. 8, and may include another item.

For example, order management apparatus 30 may specify a merchandise item to be changed and a merchandise item not to be changed among ordered merchandise item candidates. For example, the user may select a merchandise item to be ordered (in other words, a merchandise item to be left in the order list). At portion (a) of FIG. 8, by way of example, the user selects merchandise items A, C, and F as the merchandise items to be ordered. In other words, at portion (a) of FIG. 8, the user selects changing merchandise items B, D, and E.

The user may also select any of the buttons relevant to three priorities at portion (a) of FIG. 8, for example.

Order management apparatus 30 may perform the merchandise item change based on the selection by the user. For example, at portion (a) of FIG. 8, when merchandise items A, C, and F are selected as the ordered merchandise items, order management apparatus 30 may perform the changing process on non-selected merchandise items B, D, and E. For example, at portion (b) of FIG. 8, order management apparatus 30 changes merchandise items B, D, and E to similar merchandise items B', d, and E2, respectively.

By way of one example, an example of the above-described changing process for changing merchandise item E to merchandise item E2 in order management apparatus 30 will be described. For example, order management apparatus 30 may extract at least one similar merchandise item similar to merchandise item E from a plurality of merchandise items. Further, for example, order management apparatus 30 may extract, from among extracted similar merchandise items, a similar merchandise item with an erroneous recognition risk being lower than the threshold with respect to the ordered merchandise item candidates (merchandise items A and F at portion (a) of FIG. 8) with an erroneous recognition risk being equal to or higher than the threshold with respect to merchandise item E. Further, order management apparatus 30 may extract, as the similar merchandise item, a merchandise item with an erroneous recognition risk lower than that of merchandise item E, regardless of whether or not the erroneous recognition risk is less than the threshold. This is because, even when the erroneous recognition risk is equal to or higher than the threshold, only a few problems are caused in practice in some cases such as cases where an excessively severe threshold is set. Further, order management apparatus 30 may extract all the merchandise items with an erroneous recognition risk lower than that of merchandise item E, and may then distinguishingly display the merchandise items with an erroneous recognition risk being equal to or higher than the threshold and the merchandise items with an erroneous recognition risk being lower than the threshold.

Then, for example, order management apparatus 30 may determine merchandise item E2, a substitute after the change, from among the extracted similar merchandise items based on the priority selected by the user. For example, in the case of "Prioritize erroneous recognition risk," order management apparatus 30 may determine the similar merchandise item with the smallest erroneous recognition risk among the extracted similar merchandise items as the substitute merchandise item after the change. Further, for example, in the case of "Prioritize sales," order management apparatus 30 may determine, as the substitute merchandise item after the change, a similar merchandise item resulting in maximized sales (for example, sales price or profit) from among the extracted similar merchandise items. Further, for example, in the case of "Prioritize stock," order management apparatus 30 may determine, as the substitute merchandise item after the change, a similar merchandise item included in the inventory of the store among the extracted similar merchandise items.

Figure 9:
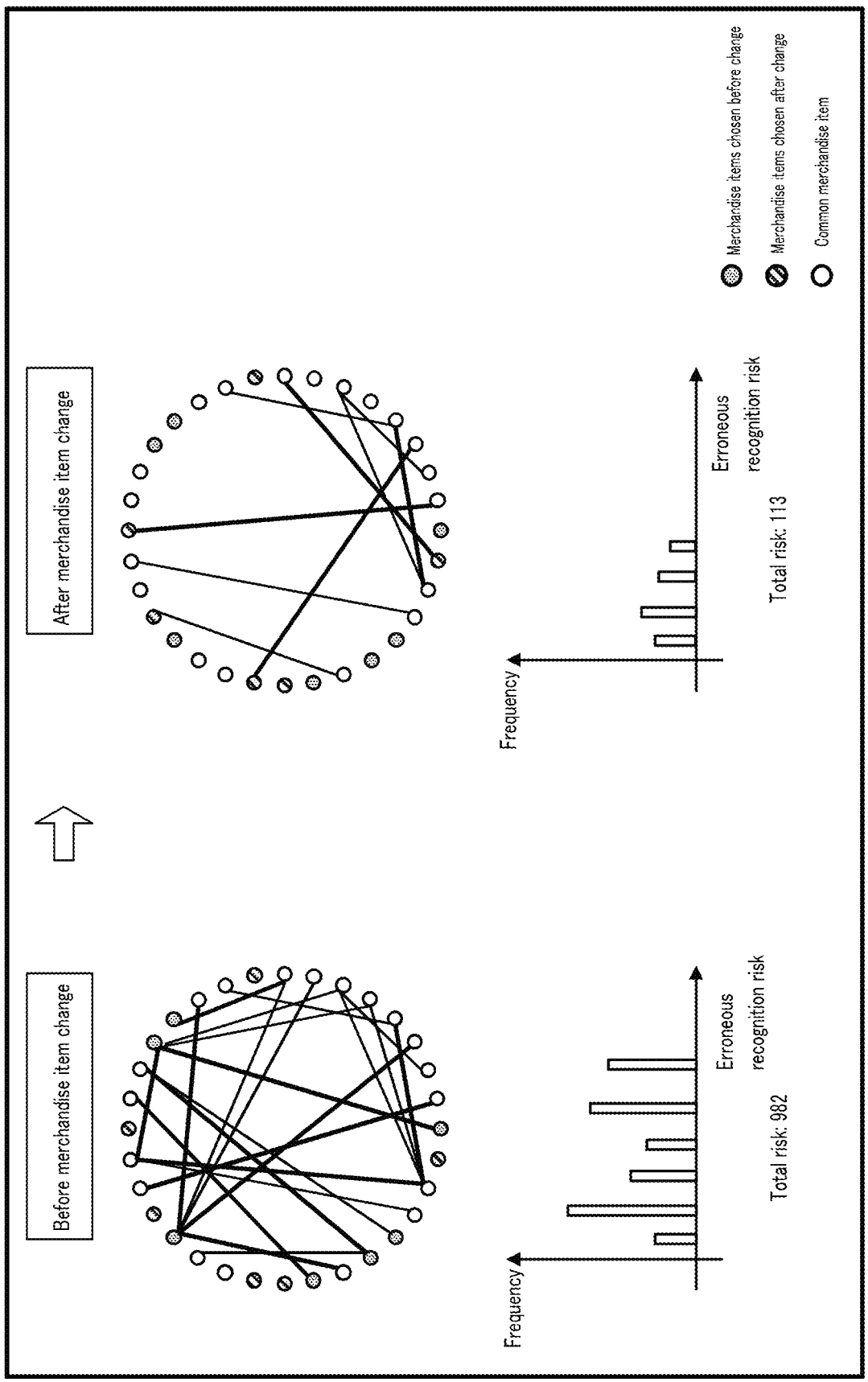
FIG. 9 is a diagram illustrating an example of display of the erroneous recognition risk before and after merchandise item change.

In addition, order management apparatus 30 may display, for example, a change in the erroneous recognition risk before and after the order change for the ordered merchandise item candidate with an erroneous recognition risk being equal to or higher than the threshold. FIG. 9 is a diagram illustrating one example of a screen for displaying information on the erroneous recognition risks before and after merchandise item change.

As illustrated in FIG. 9, order management apparatus 30 may display, for example, the merchandise item pairs with an erroneous recognition risk being equal to or higher than the threshold in the merchandise item group before and after the merchandise item change. The graph type erroneous recognition risk display illustrated in FIG. 9 may include, for example, merchandise items selected both before and after the merchandise item change (for example, referred to as a "common merchandise items"), merchandise items excluded from the order list in the merchandise item changing process (for example, referred to as "merchandise items chosen before the change"), and merchandise items added to the order list in the merchandise item changing process (for example, referred to as "merchandise items chosen after the change"). In this case, order management apparatus 30 may display the common merchandise items in a display form in which the common merchandise items and the merchandise items chosen after the change can be distinguished. Specifically, a difference may be given to any of the colors, shapes, line thicknesses, sizes, and the like other than those used for displaying the erroneous recognition risk. Accordingly, it is possible to easily recognize a change of the merchandise items having changed due to a change in the order list and a change in the erroneous recognition risk caused by the change in the order list.

In the present embodiment, whether or not to perform optimization learning is determined in accordance with the user's selection. However, a control may be performed such that an order for a merchandise item with an erroneous recognition risk being equal to or higher than a threshold can be placed only after the optimization learning is performed. Accordingly, it is possible to more reliably reduce the erroneous recognition risk.

Further, as illustrated in FIG. 9, order management apparatus 30 may display, for example, the totals of the erroneous recognition risks respectively before and after the merchandise item change (for example, referred to as "total risks") and statistics (for example, the relationship between the value of the erroneous recognition risk and the frequency).

The display screen illustrated in FIG. 9 visualizes the reduction of the erroneous recognition risk between before and after the merchandise item change, and the user can confirm the reduction of the erroneous recognition risk by the merchandise item change.

Note that FIG. 9 illustrates an example in which the erroneous recognition risks both before and after the merchandise item change are displayed, but the present invention is not limited thereto. For example, the erroneous recognition risk either before or after the merchandise item change may be displayed. For example, a button capable of switching between the erroneous-recognition-risk display screen before the merchandise item change and the erroneous-recognition-risk display screen after the merchandise item change may be displayed.

In addition, either one of the display (the graph type in FIG. 9) relating to the erroneous recognition risks among a plurality of merchandise items and the display of the totals or statistical values of the erroneous recognition risks illustrated in FIG. 9 may be displayed.

Further, the display relating to the erroneous recognition risks among the plurality of merchandise items (the graph type in FIG. 9) and the display of the totals or statistical values of the erroneous recognition risks are not limited to the example illustrated in FIG. 9.

[Processing Relevant to Optimization Learning]

Figure 10:
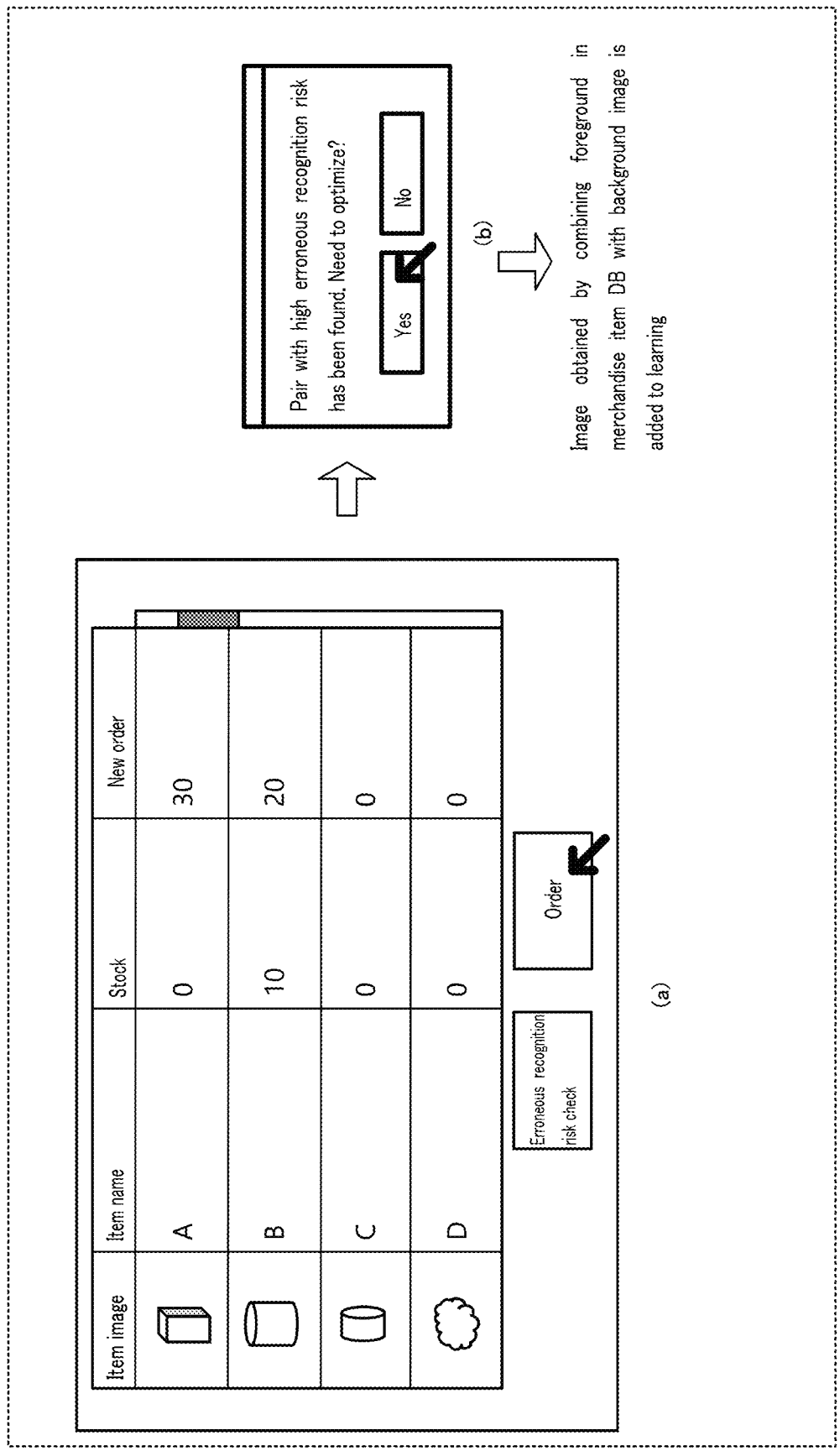
FIG. 10 is a diagram illustrating an example of display related to an optimization learning process.

As described above, order management apparatus 30 may perform a process related to optimization learning when detecting the press by a user of the "order" button on the display screen displaying the order list, for example, as illustrated at portion (a) of FIG. 10.

In FIG. 3, order management apparatus 30 may obtain, for example, a similarity degree between an ordered merchandise item and another merchandise item (S106). For example, order management apparatus 30 may obtain, from server 10, a similarity degree of a merchandise item pair including the ordered merchandise item among a plurality of merchandise items including the ordered merchandise item and in-stock merchandise items.

For example, order management apparatus 30 determines whether or not there is a merchandise item pair for which the obtained similarity degree is equal to or higher than a threshold (S107). When there is no merchandise item pair for which the similarity degree is equal to or higher than the threshold (S107: No), order management apparatus 30 performs, for example, a process of S110 to be described later.

On the other hand, when there is a merchandise item pair for which the similarity degree is equal to or higher than the threshold (S107: Yes), order management apparatus 30 determines whether or not to perform the optimization learning for the ordered merchandise item included in the merchandise item pair for which the similarity degree is equal to or higher than the threshold (S108). For example, as illustrated at portion (b) of FIG. 10, order management apparatus 30 may display a screen on which the user can select whether or not to perform the optimization learning. Based on the detected selection by the user (at portion (b) of FIG. 10, execution of the optimization learning is selected), order management apparatus 30 may determine whether or not to perform the optimization learning.

When the optimization learning is not performed (S108: No), order management apparatus 30 performs, for example, the process of S110 to be described later. On the other hand, when the optimization learning is performed (S108: Yes), order management apparatus 30 transmits, to server 10, for example, information regarding background image data for a merchandise item (corresponding to the foreground, for example) (S109).

The background image data may be, for example, image data of a checkout table installed in a store without any merchandise item being placed thereon. The background image data may also be, for example, image data of each of a plurality of checkout tables installed in the store.

Further, for example, the information on the background image data may include the background image data and information (for example, a merchandise item name or a merchandise item ID) for identifying the ordered merchandise item that is a target of the optimization learning. Further, for example, the information on the background image data may include information for identifying a place (for example, a store or a checkout table) corresponding to the background image data.

For example, server 10 may combine the image data of the merchandise item as a target of the optimization learning with the background image data transmitted by order management apparatus 30, and perform the optimization learning (for example, model learning) based on the merchandise item image data after the combination.

As described above, order management apparatus 30 may determine, for example, based on the erroneous recognition risk, whether or not to perform the optimization learning (for example, recognition model learning) of the merchandise item pair based on the background image data used in the place where the image recognition of the merchandise item pair is performed (for example, the checkout table). For example, when ordering an ordered merchandise item candidate included in a merchandise item pair with an erroneous recognition risk being equal to or higher than a threshold, order management apparatus 30 obtains the background image data of the place where the image recognition is performed and where none of the merchandise items are included. Then, server 10 may perform optimization learning for the ordered merchandise item using the background image data.

In the optimization learning, for example, a recognition model based on an actual environment (for example, an image including a merchandise item and a background) of a store where the merchandise item recognition system performs a merchandise item recognition process is constructed. It is thus possible to improve the recognition accuracy for recognition of the merchandise item in comparison with a recognition model based on an image of the merchandise item that does not include the background. Further, the recognition model based on the background image data of the store is reconstructed at the time of ordering the merchandise item. Thus, the image recognition of the merchandise item by the recognition model with improved recognition accuracy becomes possible at the time of checkout by the customer. It is thus possible to reduce the erroneous recognition of the merchandise item. In addition, when information for identifying the place corresponding to the background image data is stored together, the reconstructed recognition model may be used only at the place corresponding to the background image data used for the reconstruction. This is because the reconstructed recognition model is expected to show particularly good results in image recognition of the merchandise item on the background corresponding to the data used for reconstruction.

Note that, for example, server 10 may perform the optimization learning based on the background image at each checkout table in the store, or may use (in other words, divert) the learned model based on the background image at a certain checkout table in the store for the optimization learning for another checkout table installed in the same environment as the certain checkout table in the store. In addition, when conditions as described above are satisfied, shadows, illumination environments, and the like of checkout tables tend to be similar to one another. Therefore, the result of the image recognition of the merchandise item is expected to be better than that obtained by the recognition model before the reconstruction.

Further, a mode of the optimization learning is not limited to the one using the background image data. For example, even when an image of an article placed on a checkout table is learned without a background image, information on a shade and the like of the merchandise item placed on the checkout table is reflected in the reconstructed recognition model. It is thus possible to reduce the erroneous recognition risk. That is, the optimization learning may be performed using another technique as long as the learning is performed reflecting the image data at the place where the image recognition is performed (the checkout table in the above-described example).

The operation example of merchandise item management system 1 has been described above.

As described above, for example, at the timing of ordering a merchandise item, order management apparatus 30 presents, to the user, a merchandise item pair with a high erroneous recognition risk (for example, equal to or higher than a threshold) with respect to a merchandise item group of a store including the ordered merchandise item and an in-stock merchandise item. Thus, for example, even a user who does not have sufficient technical knowledge of image recognition can check the erroneous recognition risk of the ordered merchandise item candidate and order the merchandise item group that reduces the erroneous recognition risk.

Therefore, according to the present embodiment, for example, the merchandise item group in which the erroneous recognition risk in image recognition is reduced can be exhibited in the store, and thus erroneous recognition at the time of checkout by a customer can be reduced. Further, according to the present embodiment, for example, it is possible to exhibit a merchandise item group with a low erroneous recognition risk in the store. It is thus possible to reduce erroneous recognition at the time of checkout without performing the processes such as reconstruction of a recognition model and evaluation by test data at the timing of checkout for the merchandise item.

Note that the configuration of merchandise item management system 1 is not limited to the configuration illustrated in FIG. 1. For example, at least one of the components included in server 10 illustrated in FIG. 1 may be provided in order management apparatus 30. Alternatively, for example, at least one of the components included in order management apparatus 30 illustrated in FIG. 1 may be provided in server 10. For example, at least one of the judging process for judging the erroneous recognition risk, the generation process for generating the erroneous-recognition-risk display screen, and the merchandise item changing process may be performed in server 10.

Further, the above-described embodiment has been described in relation to the case where order management apparatus 30 displays the erroneous recognition risk, but the method for outputting the erroneous recognition risk is not limited to this. For example, information regarding the erroneous recognition risk may be outputted by sound (e.g., voice) or printed on paper.

Further, regarding the above-described embodiment, the merchandise item exhibited in the store has been described as one example of an article to be judged in terms of the erroneous recognition risk (or as one example of the image recognition target), but the article to be judged in terms of the erroneous recognition risk is not limited to the merchandise item. That is, the disclosure of the present embodiment is also applicable to a facility other than a store or an article other than a merchandise item as long as it is useful to previously reduce the erroneous recognition risk of a plurality of articles on which image recognition is to be performed later. For example, a case is supposed in which a set of books to be lent is determined in an unmanned library or the like that manages, by image recognition, books to be lent.

Further, the above-described embodiment has been described in relation to the case in which the background image data in the store is transmitted to server 10 for the optimization learning, but the present invention is not limited thereto. For example, in a case where backgrounds at the time of checkout of merchandise items (for example, layouts around checkout tables) are the same among a plurality of stores, the background image data in a certain store may be diverted for the background image data for each store. Alternatively, server 10 may store the background image data (for example, fixed background data) in advance. In this case, a component (for example, background obtainer 207) relating to obtainment of the background image data for each store does not have to be provided. In addition, when an actual merchandise item is available in a store for the optimization learning, an image in which the merchandise item is placed on an actual checkout table may be captured and used for the optimization learning. In this case, combining the background image data and the merchandise item image can be omitted.

Although the embodiment according to the present disclosure has been described above in detail with reference to the drawings, the functions of merchandise item management system 1 described above can be implemented by a computer program.

Figure 11:
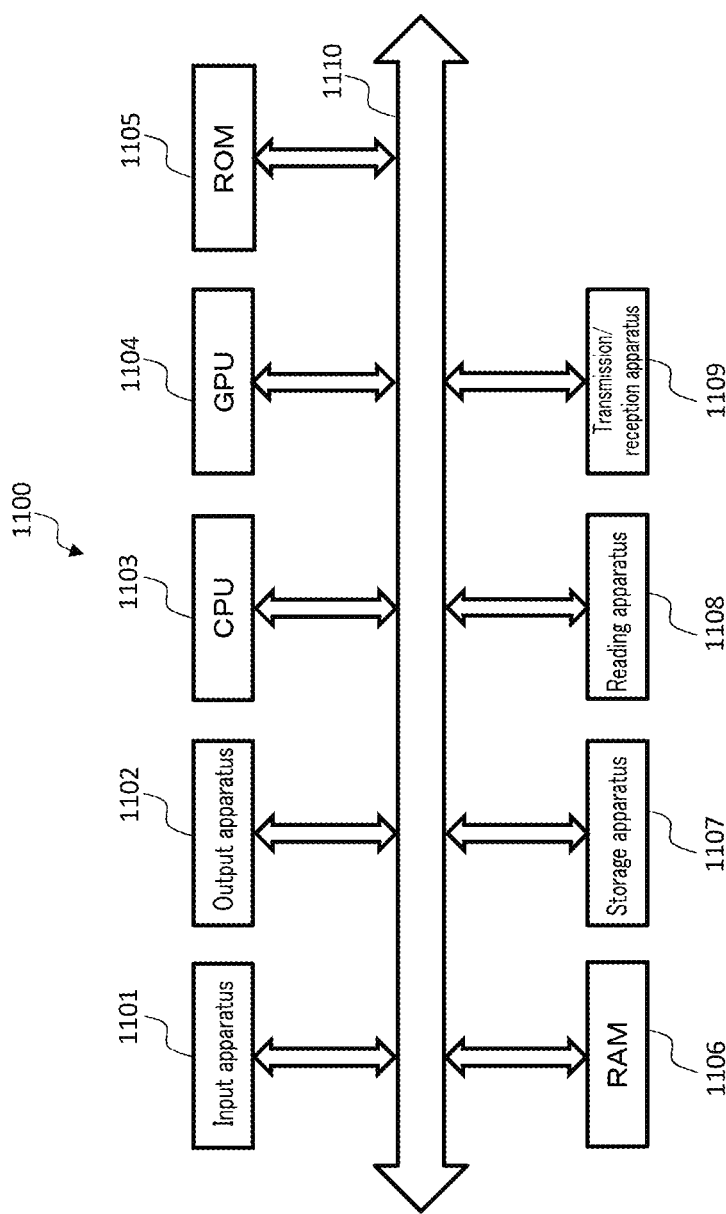
FIG. 11 is a diagram illustrating a hardware configuration example of a computer.

FIG. 11 illustrates a hardware configuration of a computer in which the functions of the apparatuses are implemented by a program. This computer 1100 includes input apparatus 1101 such as a keyboard, mouse, touch pen, and/or touch pad, output apparatus 1102 such as a display or speaker, Central Processing Unit (CPU) 1103, Graphics Processing Unit (GPU) 1104, Read Only Memory (ROM) 1105, Random Access Memory (RAM) 1106, storage apparatus 1107 such as a hard disk apparatus or a Solid State Drive (SSD), reading apparatus 1108 for reading information from recording medium such as a Digital Versatile Disk Read Only Memory (DVD-ROM) or a Universal Serial Bus (USB) memory, and transmission/reception apparatus 1109 for communicating over a network, which are connected to one another by bus 1110.

Reading apparatus 1108 reads a program for implementing the functions of the respective apparatuses from the recording medium in which the program is recorded, and stores the program in storage apparatus 1107. Alternatively, transmission/reception apparatus 1109 communicates with a server apparatus connected to the network to download, from the server apparatus, the aforementioned program for implementing the functions of the respective apparatuses and store the program in storage apparatus 1107.

Then, CPU 1103 copies the program stored in storage apparatus 1107 to RAM 1106, and sequentially reads instructions included in the program from RAM 1106, so as to implement the functions of the respective apparatuses.

Each functional block used for explaining the above-mentioned embodiments is realized as an LSI which is typically an integrated circuit. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

In addition, the technique of circuit integration is not limited to the LSI, and it may be realized by a dedicated circuit or a general-purpose processor. A Field Programmable Gate Array (FPGA) that can be programmed after LSI fabrication or a reconfigurable processor that can reconfigure connections and settings of circuit cells inside the LSI may be used.

If future integrated circuit technology replaces LSIs as a result of the advancement of semiconductor technology or other derivative technology, the functional blocks could be integrated using the future integrated circuit technology. Biotechnology can also be applied.

In addition, in recent years, in Internet of Things (IoT) technology, Cyber Physical Systems (CPS), which is a new concept of creating new added value by information collaboration between physical space and cyberspace, has been attracting attention. Also in the above embodiments, this CPS concept can be adopted.

That is, as a basic configuration of the CPS, for example, an edge server disposed in the physical space and a cloud server disposed in the cyberspace can be connected via a network, and processing can be distributedly performed by processors mounted on both of the servers. Here, it is preferable that processed data generated in the edge server or the cloud server be generated on a standardized platform, and by using such a standardized platform, it is possible to improve efficiency in building a system including various sensor groups and/or IoT application software.

In the above-described embodiment, for example, the edge server may be disposed in a store, and may perform the merchandise item ordering process and the judging process for judging an erroneous recognition risk of a merchandise item. The cloud server may perform model learning using, for example, data received from the edge server via the network.

Further, in the above-described embodiment, for example, the edge server may perform the merchandise item ordering process, and the cloud server may perform the judging process for judging an erroneous recognition risk of a merchandise item.

An order management apparatus according to one exemplary embodiment of the present disclosure includes: input circuitry, which, in operation, obtains information on a plurality of articles including a candidate for an article to be ordered, the plurality of articles being to be a target of image recognition after the candidate for the article to be ordered is ordered; control circuitry, which, in operation, determines an index indicating a probability that two or more different articles included in the plurality of articles are erroneously recognized as identical articles during the image recognition of the two or more different articles, the determining being based on information on a similarity degree of the plurality of articles in the image recognition; and output circuitry, which, in operation, outputs information on the determined index before the candidate for the article to be ordered is ordered.

In one embodiment of the present disclosure, the output circuitry displays a graph in which a node corresponding to each of the plurality of articles is connected to a node corresponding to an article having the probability of being erroneously recognized.

In one embodiment of the present disclosure, the output circuitry displays, for each of the plurality of articles and in an enumerated manner, information indicating another article and a value of the index in a relationship with said another article.

In one embodiment of the present disclosure, the output circuitry displays a table, in which the plurality of articles are disposed on one axis, an article having the probability of being erroneously recognized as a corresponding one of the plurality of articles is disposed on another axis, and information reflecting a value of the index is displayed in a cell corresponding to the article having the probability of being erroneously recognized as the corresponding one of the plurality of articles.

In one embodiment of the present disclosure, the output circuitry displays in an emphasized manner a combination which has the index equal to or greater than a threshold from among a plurality of combinations of the plurality of articles.

In one embodiment of the present disclosure, the output circuitry displays in an emphasized manner a combination which has the index equal to or greater than a threshold from among a plurality of combinations of the plurality of articles, and hides or displays in a de-emphasized manner a combination from among the plurality of combinations which has the index less than the threshold.

In one embodiment of the present disclosure, the output circuitry outputs the information on the index corresponding to a case where a first article included in the candidate for the article to be ordered is changed to a second article similar to the first article.

In one embodiment of the present disclosure, the control circuitry selects the second article based on the information on the similarity degree, such that the index corresponding to a case where the second article is included in the candidate for the article to be ordered is lower than the index corresponding to a case where the first article is included in the candidate for the article to be ordered.

In one embodiment of the present disclosure, the output circuitry outputs the information on the index corresponding to a case before the first article is changed to the second article, and the information on the index corresponding to a case after the first article is changed to the second article.

In one embodiment of the present disclosure, the control circuitry determines the second merchandise item based on one of the index and selection by a user.

In one embodiment of the present disclosure, the output circuitry outputs the information on the index corresponding to a case where the first article included in the candidate for the article to be ordered is excluded from the candidate for the article to be ordered.

In one embodiment of the present disclosure, the output circuitry outputs the information on the index corresponding to a case before the first article is excluded and the information on the index corresponding to a case after the first article is excluded.

In one embodiment of the present disclosure, in a case where an article included in a combination having the index being equal to or greater than a threshold is ordered without changing or deleting the article from a target to be ordered, the output circuitry outputs a display which asks for determination of whether or not to perform model learning of the combination based on image data of a place where image recognition of the combination is performed.

In one embodiment of the present disclosure, when the model learning is performed, the control circuitry performs the model learning of the combination using background image data used at the place where the image recognition is performed.

An order management method according to one exemplary embodiment of the present disclosure includes steps performed by an order management apparatus of: obtaining information on a plurality of articles including a candidate for an article to be ordered, the plurality of articles being to be a target of image recognition after the candidate for the article to be ordered is ordered; determining an index indicating a probability that two or more different articles included in the plurality of articles are erroneously recognized as identical articles during the image recognition of the two or more different articles, the determining being based on information on a similarity degree of the plurality of articles in the image recognition; and outputting information on the determined index before the candidate for the article to be ordered is ordered.

The disclosure of Japanese Patent Application No. 2020-092346, filed on May 27, 2020, including the specification, drawings and abstract is incorporated herein by reference in its entirety.

INDUSTRIAL APPLICABILITY

One exemplary embodiment of the present disclosure is useful for a merchandise item management system.

REFERENCE SIGNS LIST

1 Merchandise item management system
10 Server
20 Store system
30 Order management apparatus
101 Merchandise item DB
102 Model learner
103 Similarity degree calculator
104 Background combiner
105, 202 Storage
201 Inventory DB
203 Ordered merchandise item selector
204 Erroneous recognition risk determiner
205 Erroneous recognition risk display
206 Merchandise item recognizer
207 Background obtainer

The invention claimed is:

1. An order management apparatus, comprising:
a processor, in cooperation with a memory storing instructions, performs operations including:
obtaining information on a plurality of articles including a candidate for an article to be ordered, the plurality of articles being a target of image recognition at a checkout table or a register after the candidate for the article to be ordered is ordered, the checkout table or the register performing the image recognition of the article placed on the checkout table or the register based on a learned model when the article is checked out or registered;
determining an index indicating a probability that two or more different articles included in the plurality of articles are erroneously recognized as identical articles during the image recognition of the two or more different articles, the determining being based on information on a similarity degree of the plurality of articles in the image recognition; and
outputting, on a display, information on the determined index before the candidate for the article to be ordered is ordered, by displaying a graph in which a node corresponding to each of the plurality of articles is connected to a node corresponding to an article having the index equal to or greater than a threshold, wherein the node is selectably displayed,
in response to receiving a selection of the node corresponding to a first article in the candidate for the article to be ordered, a similar item search button is displayed,
in response to receiving a selection of the similar item search button, at least one similar article to the first article is selectably displayed, and
in response to receiving a selection of a second article in the at least one similar article, the first article is replaced with the selected second article that lowers probability to be erroneously recognized in the candidate for the article to be ordered.

2. The order management apparatus according to claim 1, wherein
the processor displays in an emphasized manner a combination which has the index equal to or greater than the threshold from among a plurality of combinations of the plurality of articles.

3. The order management apparatus according to claim 1, wherein
the processor displays in an emphasized manner a combination which has the index equal to or greater than the threshold from among a plurality of combinations of the plurality of articles, and hides or displays in a de-emphasized manner a combination from among the plurality of combinations which has the index less than the threshold.

4. The order management apparatus according to claim 1, wherein
the processor further outputs, on the display, the information on the index corresponding to a case where the first article included in the candidate for the article to be ordered is changed to the second article similar to the first article.

5. The order management apparatus according to claim 1, wherein
the processor further outputs, on the display, the information on the index corresponding to a case before the first article is changed to the second article, and the information on the index corresponding to a case after the first article is changed to the second article.

6. The order management apparatus according to claim 1, wherein
the processor further outputs, on the display, the information on the index corresponding to a case where the first article included in the candidate for the article to be ordered is excluded from the candidate for the article to be ordered.

7. The order management apparatus according to claim 1, wherein
the processor outputs, on the display, the information on the index corresponding to a case before the first article is excluded and the information on the index corresponding to a case after the first article is excluded.

8. The order management apparatus according to claim 1, wherein
in a case where the first article included in a combination having the index being equal to or greater than the threshold is ordered without changing or deleting the article from a target to be ordered, the processor outputs a display which asks for determination of whether or not to perform model learning of the combination based on image data of the checkout table or the register where the image recognition of the combination is performed.

9. The order management apparatus according to claim 8, wherein
when the model learning is performed, the processor further performs the model learning of the combination using background image data obtained at the checkout table or the register where the image recognition is performed.

10. An order management method performed by a processor of an order management apparatus, comprising:
obtaining information on a plurality of articles including a candidate for an article to be ordered, the plurality of articles being a target of image recognition at a checkout table or a register after the candidate for the article to be ordered is ordered, the checkout table or the register performing the image recognition of the article placed on the checkout table or the register based on a learned model when the article is checked out or registered;
determining an index indicating a probability that two or more different articles included in the plurality of articles are erroneously recognized as identical articles during the image recognition of the two or more different articles, the determining being based on information on a similarity degree of the plurality of articles in the image recognition; and
outputting, on a display, information on the determined index before the candidate for the article to be ordered is ordered, by displaying a graph in which a node corresponding to each of the plurality of articles is connected to a node corresponding to an article having the index equal to or greater than a threshold, wherein
the node is selectably displayed,
in response to receiving a selection of the node corresponding to a first article in the candidate for the article to be ordered, a similar item search button is displayed,
in response to receiving a selection of the similar item search button, at least one similar article to the first article is selectably displayed, and
in response to receiving a selection of a second article in the at least one similar article, the first article is replaced with the selected second article that lowers probability to be erroneously recognized in the candidate for the article to be ordered.

* * * * *